United States Patent [19]

Niwa et al.

[11] Patent Number: 4,837,309

[45] Date of Patent: Jun. 6, 1989

[54] MONOHALO SUBSTITUTED TRIAZINYL MONOAZO DYESTUFFS FOR CELLULOSE-CONTAINING FIBERS

[75] Inventors: Toshio Niwa; Kiyoshi Himeno; Toshio Hihara, all of Yokohama; Yutaka Kurose, Kawasaki; Yukiharu Shimizu, Yokohama, all of Japan

[73] Assignee: Mitsubishi Chemical Industries Limited, Tokyo, Japan

[21] Appl. No.: 583,233

[22] Filed: Feb. 24, 1984

[30] Foreign Application Priority Data

Mar. 16, 1983 [JP] Japan .................................. 58-43793

[51] Int. Cl.$^4$ ...................... C09B 62/02; C09B 62/03; D06P 1/382
[52] U.S. Cl. .................................. 534/632; 534/588; 534/597; 534/635; 534/731; 534/732; 534/752
[58] Field of Search ........................... 266/153, 146 T; 534/632, 635, 636

[56] References Cited

FOREIGN PATENT DOCUMENTS 55-151064 11/1980 Japan .................................. 260/153

Primary Examiner—Floyd D. Higel
Attorney, Agent, or Firm—Oblon, Fisher, Spivak, McClelland & Maier

[57] ABSTRACT

A monoazo dyestuff of the formula:

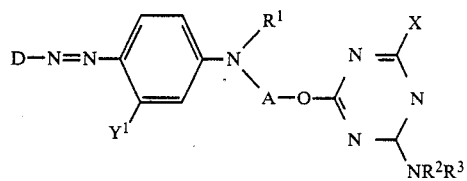

wherein D represents substituted or unsubstituted phenyl, imidazolyl, pyridyl, thiazolyl, thiadiazolyl, thienyl, benzoisothiazolyl, pyridinoisothiazolyl, thienoisothiazolyl, thienothiazolyl or benzothiazolyl, $R^1$ represents substituted or unsubstituted alkyl, cyclohexyl, alkenyl, aralkyl or aryl, $R^2$ and $R^3$ each represents hydrogen, alkyl optionally substituted by cyano, hydroxy, alkoxy or alkoxyalkoxy, alkenyl, cyclohexyl, aryl or aralkyl, or together represent a 5- or 6-membered nitrogen-containing heterocyclic ring formed by combining $R^2$ and $R^3$, A represents

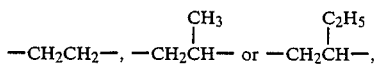

X represents fluorine or chlorine, and $Y^1$ represents hydrogen, chlorine, methyl or acylamino. The monoazo dyestuff is especially useful in the dyeing of cellulose-containing fibers and exhibits good fastness properties including good wet color fastness and good light fastness.

9 Claims, No Drawings

MONOHALO SUBSTITUTED TRIAZINYL MONOAZO DYESTUFFS FOR CELLULOSE-CONTAINING FIBERS

BACKGROUND OF THE INVENTION

1. Field of the Invention

This invention relates to azo dyestuffs for cellulose-containing fibers. More specifically, it relates to reactive monoazo dyestuffs which dye cellulose-containing fibers, in particular cellulose fibers and fiber mixtures comprising polyester fibers and cellulose fibers, in orange to blue colors having excellent various fastness properties including light fastness.

2. Description of the Prior Art

Dyestuffs having similar structures as those of this invention are disclosed in Japanese Patent Application Laid-open No. 151064/1980, but it is evident as demonstrated by Comparative Example in Table 1 that the dyestuffs of this invention are much more superior in fastness properties such as light fastness, wet color fastness etc. and also dyeing properties such as coloring value etc.

SUMMARY OF THE INVENTION

Accordingly, this invention provides monoazo dyestuffs for cellulose-containing fibers which are of the formula [I]:

$$D-N=N-\underset{Y^1}{\underset{|}{\bigcirc}}-N\underset{A-O}{\overset{R^1}{\diagdown}}\underset{NR^2R^3}{\overset{N=\overset{X}{\diagup}}{\diagdown N}} \quad [I]$$

wherein D represents substituted or unsubstituted phenyl, imidazolyl, pyridyl, thiazolyl, thiadiazolyl, thienyl, benzoisothiazolyl, pyridinoisothiazolyl, thienoisothiazolyl, thienothiazolyl or benzothiazolyl, $R^1$ represents substituted or unsubstituted alkyl, cyclohexyl, alkenyl or aryl, $R^2$ and $R^3$ each represents hydrogen or alkyl optionally substituted by cyano, hydroxy, alkoxy or alkoxyalkoxy, alkenyl, cyclohexyl, aryl or aralkyl or together represent a 5- or 6-membered nitrogen-containing heterocyclic ring formed by combining $R^2$ and $R^3$, A represents

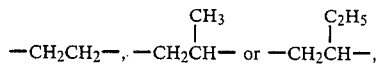

X represents fluorine or chlorine, and $Y^1$ represents hydrogen, chlorine, methyl or acylamino.

DETAILED DESCRIPTION OF THE INVENTION

Examples of the substituted or unsubstituted phenyl, imidazolyl, pyridyl, thiazolyl, thiadiazolyl, thienyl, benzoisothiazolyl, pyridinoisothiazolyl, thienoisothiazolyl, thienothiazolyl or benzothiazolyl represented by D in the formula [I] above include phenyl; phenyl substituted by fluorine, chlorine, bromine, methyl, ethyl, trifluoromethyl, methoxy, ethoxy, phenylazo, cyano, nitro, methylsulfonyl, ethylsulfonyl, arylsulfonyl, lower alkoxycarbonyl, lower alkoxyethoxycarbonyl, aryloxyethoxycarbonyl, mono-lower-alkylaminocarbonyl, di-lower-alkylaminocarbonyl, diallylaminocarbonyl, monoallylaminocarbonyl, dimethylaminosulfonyl, diethylaminosulfonyl, monomethylaminosulfonyl, monoethylaminosulfonyl, acetyl, phenyl etc.; pyridyl; pyridyl substituted by chlorine, bromine, nitro, methyl, methylsulfonyl, cyano etc.; thiazolyl; thiazolyl substituted by methyl, chlorine, bromine, nitro, lower alkoxycarbonyl, methoxyethoxycarbonyl, ethoxyethoxycarbonyl, trifluoromethyl, methylsulfonyl etc.; 1,3,4-thiadiazolyl; 1,3,4-thiadiazolyl substituted by alkylthio, arylthio, alkenylthio, aralkylthio, bromine, chlorine, trifluoromethyl, alkylsulfonyl etc.; 1,2,4-thiadiazolyl; 1,2,4-

TABLE 1

| | Structural Formula | Light Fastness Grade | Wet Color Fastness Grade | Coloring Value % |
|---|---|---|---|---|
| Known Dyestuff | (structure shown) | 3 | 3–4 | 81 |
| Dyestuff of the Invention | (structure shown) | 5 | 4–5 | 93 |

Notes
(1) Wet Color Fastness A test was conducted on a polyurethane-finished dyed cloth by a method according to Method A of JIS L 0846 except that a silk cloth was attached instead of the nylon cloth, and the degree staining of the silk cloth was judged using a gray scale.
(2) The cloth used for dyeing was a polyester/cotton (65/35) cloth.

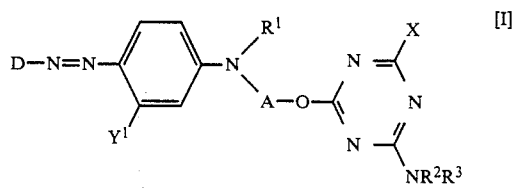

thiadiazolyl substituted by alkylthio, arylthio, alkenylthio, aralkylthio, alkoxycarbonyl etc.; dicyanoimidazolyl; thienyl substituted by cyano, chlorine, bromine, acetyl, formyl, nitro, alkoxycarbonyl, sulfomethyl etc.; benzoisothiazolyl; benzoisothiazolyl substituted by nitro, bromine, chlorine, acetyl, alkoxycarbonyl etc.; pyridinoisothiazolyl substituted by cyano, methyl, nitro etc.; thienoisothiazolyl; thienoisothiazolyl substituted by nitro, bromine, chlorine, cyano etc.; thienythiazolyl; thienothiazolyl substituted by nitro, bromine, chlorine etc.; benzothiazolyl; and benzothiazolyl substituted by methyl, chlorine, bromine, nitro, lower alkoxycarbonyl, thiocyano, trifluoromethyl, methylsulfonyl etc. Examples of the acylamino represented by $Y^1$ include acetylamino, chloroacetylamino, benzoylamino, methylsulfonylamino, chloropropionylamino, ethoxycarbonylamino, ethylaminocarbonylamino etc. Examples of the unsubstituted alkyl represented by $R^1$ include methyl, ethyl, straight-chain or branched-chain propyl, butyl, pentyl, hexyl, heptyl, octyl etc., examples of the substituted alkyl include lower alkoxyalkyl such as methoxyethyl, ethoxyethyl, butoxyethyl etc.; lower alkoxyalkoxyalkyl such as methoxyethoxyethyl, ethoxyethoxyethyl etc.; phenoxyalkyl such as phenoxyethyl etc.; optionally substituted aralkyloxy-lower-alkyl such as benzyloxyethyl, chlorobenzyloxyethyl etc.; optionally substituted hydroxyalkyl such as hydroxyethyl, hydroxypropyl, hydroxybutyl, hydroxyhexyl, 2-hydroxy-3-methoxypropyl etc.; cyano-lower-alkyl such as cyanomethyl, cyanoethyl etc.; optionally substituted acyloxy-lower-alkyl such as acetyloxyethyl, chloroacetyloxyethyl, chloropropionyloxyethyl, benzoyloxyethyl etc.; alkoxycarbonyloxy-lower-alkyl such as methoxycarbonyloxyethyl, methoxyethoxycarbonyloxyethyl etc.; carbamoyl-lower-alkyl such as carbamoylmethyl, carbamoylethyl etc.; optionally substituted alkoxycarbonyl-lower-alkyl such as methoxycarbonylmethyl, ethoxycarbonylmethyl, methoxyethoxycarbonylmethyl, benzyloxycarbonylmethyl etc.; optionally substituted aralkyl such as benzyl, phenethyl, chlorobenzyl etc.; allyloxycarbonyl-lower-alkyl such as allyloxycarbonylethyl, allyloxycarbonylmethyl etc.; tetrahydrofurfuryl; succinimido-lower-alkyl such as succinimidoethyl etc.; phthalimido-lower-alkyl such as phthalimidoethyl etc.; cyanoalkoxy-lower-alkyl such as cyanoethoxyethyl, cyanomethoxyethyl etc.; and halogeno-lower-alkyl such as chloroethyl etc.; and examples of the aryl include phenyl, chlorophenyl, methylphenyl etc. Further, examples of the nitrogen-containing heterocyclic ring represented by $NR^2R^3$ include 1-pyrrolidinyl, 3-methyl-1-pyrrolidinyl, 2-hydroxyethyl-1-pyrrolidinyl, 2,5-dimethyl-1-pyrrolidinyl, 3-thiazolidinyl, 1-pyrrolyl, 1-pyrazolyl, 1-imidazolyl, morpholino, piperidino, 2,6-dimethylpiperidino, 1-piperadinyl, 4-methyl-1-piperadinyl etc.

The monoazo dyestuffs of the formula [I] above may be prepared by diazotizing an amine of the formula [II]:

D—NH$_2$  [II]

wherein D is as defined above, and coupling with an aniline of the formula [III]:

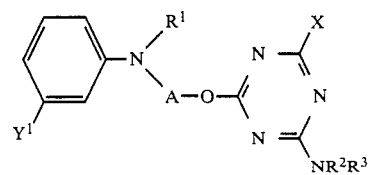 [III]

wherein X, $Y^1$, A, $R^1$, $R^2$ and $R^3$ are as defined above.

The aniline of the formula [III] may be prepared by reacting an aniline of the formula [IV]:

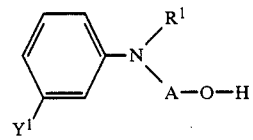 [IV]

wherein $Y^1$, $R^1$ and A are as defined above, with a 2,4,6-trihalogenotriazine in a solvent such as N-methylpyrrolidone, acetone etc. in the presence of an acid-binding agent such as triethylamine, sodium carbonate etc. at 0°–10° C. for 2–10 hours to obtain a compound of the formula [V]:

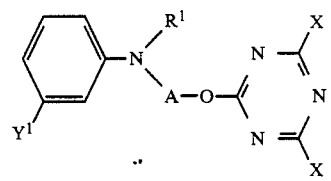 [V]

wherein X, $Y^1$, $R^1$ and A are as defined above, and thereafter reacting said compound of the formula [V] with an amine of the formula:

$R^2R^3NH$  [VI]

wherein $R^2$ and $R^3$ are as defined above, in a solvent such as N-methylpyrrolidone, acetone etc. in the presence of an acid-binding agent such as triethylamine, sodium carbonate etc. at room temperature for 2–10 hours.

Examples of the amine represented by D-NH$_2$ include benzene type amines such as aniline, o-, m- or p-fluoroaniline, o-, m- or p-chloroaniline, o-, m- or p-bromoaniline, 2,4-dichloroaniline, 2,3-dichloroaniline, 2-chloro-4-bromoaniline, 2,4-difluoroaniline, 2,4,6-trichloroaniline, o-, m- or p-toluidine, o-, m- or p-ethylaniline, o-, m- or p-anisidine, m-trifluoromethylaniline, o- or p-cyanoaniline, 4-nitro-2,6-dichloroaniline, 4-nitro-2,6-dibromoaniline, 2,4-dinitro-6-bromoaniline, o-, m- or p-nitroaniline, 2-chloro-4-nitroaniline, 2-bromo-4-nitroaniline, 2-cyano-4-nitroaniline, 2-chloro-4-methoxyaniline, o-, m- or p-methylsulfonylaniline, o-, m- or p-ethylsulfonylaniline, o-, m- or p-methoxycarbonylaniline, o-, m- or p-ethoxycarbonylaniline, p-butoxycarbonylaniline, p-aryloxycarbonylaniline, p-aryloxyethoxycarbonylaniline, o-, m- or p-methoxyethoxycarbonylaniline, p-N,N-dimethylaminocarbonylaniline, p-N-ethylaminocarbonylaniline, p-N-allylaminocarbonylaniline, 2-chloro-4-methoxycarbonylaniline, p-N,N-dimethylaminosulfonylaniline, m-N,N-diethylaminosulfonylaniline, p-N-ethylsulfonylaniline, p-phenylaniline etc.; pyridine type amines such as 3-aminopyridine, 3-amino-6-bromopyridine, 3-amino-5-bromopyridine, 3-amino-6-chloropyridine, 4,6-dichloro-3-aminopyridine, 3-amino-6-nitropyridine, 3-amino-4-cyanopyridine, 3-amino-5-methylpyridine 3-amino-6-methylsulfonylpyridine, 3-amino-4-chloro-6-nitropyridine, 3-amino-5-methyl-6-bromopyridine etc.; thiazole type amines such as 2-aminothiazole, 2-amino-4-methylthiazole, 2-amino-4-methyl-5-ethoxycarbonylthiazole, 2-amino-5-nitrothiazole, 2-amino-5-bromothiazole, 2-amino-5-chlorothiazole, 2-amino-4-trifluoromethylthiazole, 2-amino-4-methyl-5-methoxyethoxycarbonylthiazole, 2-amino-4-methyl-5-bromothiazole etc.; thiadiazole type amines such as 2-amino-1,3,4-thiadiazole, 2-amino-5-butylthio-1,3,4-thiadiazole, 2-amino-5-benzylthio-1,3,4-thiadiazole, 2-amino-5-(4-nitrophenyl)thio-1,3,4-thiadiazole, 2-amino-5-(4-chlorophenyl)thio-1,3,4-thiadiazole, 2-amino-5-bromo-1,3,4-thiadiazole, 5-amino-1,2,4-thiadiazole, 5-amino-3-ethylthio-1,2,4-thiadiazole, 5-amino-3-allylthio-1,2,4-thiadiazole, 5-amino-3-benzylthio-1,2,4-thiadiazole, 5-amino-3-ethoxycarbonyl-1,2,4-thiadiazole etc.; thiophene type amine such as 2-amino-3,5-dinitrothiophene, 2-amino-3-nitro-5-acetylthiophene, 2-amino-3-cyano-5-nitrothiophene, 2-amino-3,5-dicyanothiophene etc.; benzoisothiazole type amines such as 7-amino-1,2-benzoisothiazole, 7-amino-5-nitro-1,2-benzoisothiazole, 7-amino-5-bromo-1,2-benzoisothiazole etc.; pyridinoisothiazole type amines such as 7-amino-4-methyl-5-nitro-1,2,3-pyridinoisothiazole, 7-amino-4-methyl-5-cyano-1,2,3-pyridinoisothiazole etc.; thienoisothiazole type amines such as 6-aminothienoisothiazole, 6-amino-4-nitrothienoisothiazole, 6-amino-4-bromothienoisothiazole etc.; imidazole type amines such as 2-amino-4,5-dicyanoimidazole etc.; and benzothiazole type amines such as 2-aminobenzothiazole, 2-amino-4,6-dibromobenzothiazole, 2-amino-6-sulfomethylbenzothiazole, 2-amino-5,6-dichlorobenzothiazole, 2-amino-6-thiocyanobenzothiazole, 2-amino-6-nitrobenzothiazole etc.

Of the monoazo dyestuffs of the formula [I], dicyano compounds of the formula [VII]:

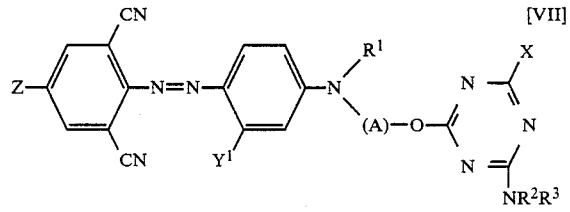

wherein X, $Y^1$, A, $R^1$, $R^2$ and $R^3$ are as defined above, and Z represents fluorine, chlorine, bromine, methyl, ethyl, trifluoromethyl, methoxy, ethoxy, phenylazo, cyano, nitro, methylsulfonyl, ethylsulfonyl, arylsulfonyl lower alkoxycarbonyl, lower alkoxyethoxycarbonyl, aryloxyethoxycarbonyl mono-lower-alkylaminocarbonyl, di-lower-alkylaminocarbonyl, diallylaminocarbonyl, monoallylaminocarbonyl, dimethylaminosulfonyl, diethylaminosulfonyl, monomethylaminosulfonyl, monoethylaminosulfonyl, acetyl, phenyl or the like may be prepared by treating a compound of the formula [VIII]:

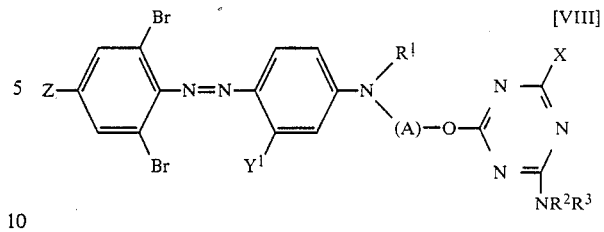

wherein X, $Y^1$, Z, A, $R^1$, $R^2$ and $R^3$ are as defined above with a metal cyanide such as cuprous cyanide etc. in a polar solvent such as dimethylformamide, N-methylpyrrolidone etc. at a temperature of 15°–120° C.

Further, N-substituted dicyanoimidazole compounds of the formula [IX]:

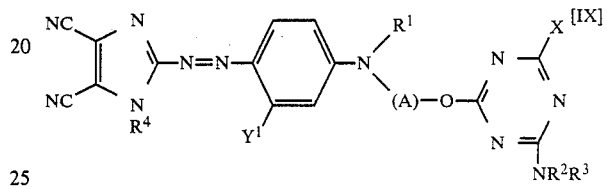

wherein X, $Y^1$, A, $R^1$, $R^2$ and $R^3$ are as defined above and $R^4$ represents alkyl; alkyl optionally substituted by alkoxy, alkoxyalkoxy, cyano, or alkoxycarbonyl; alkenyl; cyclohexyl; aralkyl; or aralkyl optionally substituted by chlorine, bromine or nitro may be prepared by treating a compound of the formula [X]:

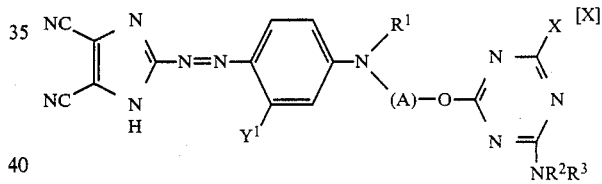

wherein X, $Y^1$, A, $R^1$, $R^2$ and $R^3$ are as defined above with a halide compound of the formula [XI]:

$$R^4T \qquad [XI]$$

wherein $R^4$ is as defined above and T represents chlorine, bromine or iodine in a polar solvent such as N-methylpyrrolidone etc. or a benzene type solvent such as chlorobenzene, o-dichlorobenzene etc. using a mutual transfer catalyst such as tetrabutylammonium bromide, crown ether etc. in the presence of a acid-binding agent such as sodium bicarbonate, potassium carbonate etc. at a temperature of 40°–120° C.

Examples of the cellulose-containing fibers which are dyed with the dyestuffs of the formula [I] of this invention include natural fibers such as cotton, linen etc.; semisynthetic fibers such as viscose rayon, copper ammonia rayon etc.; such fibers as modified cellulose fibers which are partially aminated or partially acrylated; woven or knitted fabrics thereof or non-woven fabrics thereof, etc. Further, mixed yarns or mixed woven fabrics of the above-described fibers and other fibers such as polyester fibers, cation-dyeable polyester fibers, anion-dyeable polyester fibers, polyamide fibers, wool, acryl fibers, urethane fibers, diacetate fibers, triacetate fibers etc. may also be used. Of those, the cellulose fibers and mixed yarns are particularly effectively dyed with the dyestuffs of this invention.

In dyeing, it is preferred that the dyestuff of the formula [I] above be finely dispersed in a medium in a particle size of about 0.5–2μ. Suitable examples of the dispersing method include a method which comprises finely dispersing the dyestuff in water by a grinder such as a sand grinder, a mill etc. using a water-soluble dispersing agent such as a nonionic dispersing agent, e.g., a pluronic type surface active agent, or an anionic dispersing agent, e.g., sodium ligninsulfonate or a sodium salt of a naphthalenesulfonic acid-formaldehyde condensate, etc.; a method which comprises finely dispersing the dyestuff in a solvent other than water, e.g., alcohols such as ethyl alcohol, isopropyl alcohol, polyethylene glycol etc., ketones such as acetone, methyl ethyl ketone etc., hydrocarbons such as n-hexane, toluene, xylene, mineral terpene etc., halogenated hydrocarbons such as tetrachloroethylene etc., esters such as ethyl acetate, butyl acetate etc., ethers such as dioxane, tetraethyleneglycol dimethyl ether etc., or a mixed solvent thereof, using a sparingly soluble or water-insoluble dispersing agent such as a sulfosuccinic acid ester, or an addition product of nonylphenol etc. and low moles of ethylene oxide etc.; a method which comprises finely dispersing the dyestuff in a mixed system of water and a solvent freely compatible with water chosen from the above-described solvents, etc.

In the above-described dispersing step, a polymer compound soluble in the particular dispersing medium chosen, a surface active agent having some major function other than the dispersing action, etc. may also be safely added.

While the thus obtained fine dispersion of the dyestuff may be used as such as a padding bath in pad dyeing or as a printing paste in print dyeing, it is general to use as a padding bath or a printing paste that obtained by diluting the above-described fine dispersion of the dyestuff to a concentration determined according to the desired dyeing concentration with water or a mixed system of a solvent freely compatible with water and water, or as an O/W or W/O emulsion in which the oil layer is a petroleum hydrocarbon such as mineral terpene etc. or a halogenated hydrocarbon such as tetrachloroethylene etc.

In order to advantageously carry out dyeing in the preparation of a padding bath or a printing paste, an alkali metal compound, an organic epoxy compound, an organic vinyl compound etc. may also be added as an acid-binding agent for the purpose of accelerating the reaction of cellulose fiberswelling agents or the dyestuffs with cellulose fibers. As the alkali metal compound, it is possible to employ not only alkali metal carbonates but also alkali metal bicarbonates, alkali metal phosphates, alkali metal borates, alkali metal silicates, alkali metal hydroxides, alkali metal fatty acid salts such as alkali metal acetates etc., and alkali precursor compounds which generate an alkali when heated in the presence of water, such as sodium trichloroacetate, sodium acetoacetate etc. The amount of those alkali metal compounds used is generally satisfactorily such that the pH of the padding bath or printing paste becomes 7.5–8.5.

Examples of the organic epoxy compound include ethylene glycol diglycidyl ether, polyethylene glycol diglycidyl ether having an average molecular weight of 150–400, etc. Examples of the organic vinyl compound include ethylene glycol diacrylate, diacrylate or dimethacrylate of polyethylene glycol having an average molecular weight of 150–400, etc. The amount of those compounds used is about 3–6% by weight based on the weight of the padding bath or printing paste.

For the purpose of preventing dry migration in pad dyeing or for the purpose of controlling the color paste to an optimum viscosity in various print dyeing methods, thickeners, e.g., water-soluble polymer compounds such as sodium alginate etc. may also be added.

The mode of the preparation of the padding bath or printing color paste is not restricted to the methods described above. It is not always necessary that the cellulose fiber-swelling agent and the acid-binding agent be present in the padding bath or printing color paste, but they may be previously present in fibers.

Any compound may be used as the cellulose fiber-swelling agent so long as it has a boiling point of 150° C. or higher and has an effect to swell cellulose fibers. Examples thereof include ureas such as N,N,N',N'-tetramethylurea etc., polyhydric alcohols such as polyethylene glycol, polypropylene glycol etc., or derivatives thereof. Of those, derivatives of polyhydric alcohols such as polyethylene glycol, polypropylene glycol etc. having an average molecular weight of about 200–500 in which the hydroxyl groups at both terminals have been dimethylated or diacetylated so that they do not react with the reactive groups of the dyestuff are particularly preferred as the cellulose fiber-swelling agents.

The amount of the cellulose fiber-swelling agent used is suitably about 5–25% by weight, preferably about 8–15% by weight, based on the weight of the padding bath or printing color paste.

Dyeing of the above-described fibers with the dyestuffs of the formula [I] above is conducted in the conventional manner, for example, by impregnating or printing a cellulsoe fiber-containing material with the thus prepared padding bath or printing color paste, drying heat-treating the material with hot air at 160°–220° C. or with superheated steam for 30 seconds to 10 minutes, or treating in a high pressure saturated steam at 120°–150° C. for 3–30 minutes, and finally washing with hot water containing a surface active agent, or washing in an O/W or W/O emulsion washing bath in which the oil layer is a halogenated hydrocarbon such as tetrachloroethylene etc., or washing in the conventional dry cleaning manner.

By the process described above, a dyed material which is clearly and uniformly dyed and has good light fastness and good wet color fastness may be obtained.

The present invention is more particularly described in the following examples, but it will be understood that variations and modifications can be effected within the spirit and scope of the invention. All the parts are by weight.

EXAMPLE 1

A dyestuff dispersion was prepared from a dyestuff composition composed of 15 parts of a monoazo dyestuff of the structural formula:

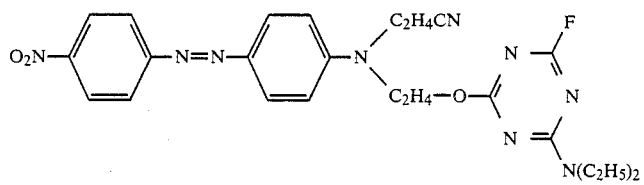

15 parts of a naphthalenesulfonic acid-formaldehyde condensate and 70 parts of water using a print shaker as a finely dispersing machine. Using this dyestuff dispersion, a printing color paste having the following composition:

| Dye dispersion | 6.5 parts |
|---|---|
| 5% sodium alginate aqueous solution | 55 parts |
| Polyethylene glycol dimethyl ether, average molecular weight: 400 | 9 parts |
| Water | 29.5 parts |
| | 100 parts (pH 8.0) | was prepared. A polyester/cotton (mixing ratio: 65/35) mixed spun cloth was print-dyed with the printing bath using a screen print dyeing machine. After provisionally drying at 80° C. for 3 minutes, the cloth was dry heated at 215° C. for 90 seconds to fix the paste. The cloth was then washed with water, and soaped with a detergent solution containing 2 g/l of a nonionic surface active agent ("Scourol #900", trademark, manufactured by Kao Soap Co., Ltd.) in a bath ratio of 1:30 at 80° C. for 20 minutes to obtain an orange dyed product having excellent light fastness and wet color fastness.

The dyestuff used in this example was prepared by diazotizing 5.6 g of p-nitroaniline, adding dropwise this diazo solution to a solution of 2 g of urea and 14.3 g of N-cyanoethyl-N-(2-fluoro-4-N,N-diethylamino-6-triazinyloxy)ethylaniline in 300 ml of methanol, filtering out the resulting precipitates, washing with water and drying at room temperature to obtain 17 g (yield 85%) of the dyestuff powder of the structural formula above.

The λmax (acetone) of this dyestuff was 457 nm.

EXAMPLE 2

A dyestuff dispersion was prepared from a dyestuff composition composed of 15 parts of a monoazo dyestuff of the structural formula:

trochemical Industries, Ltd.) and 75 parts of water using a sand grinder as a finely dispersing machine. A printing color paste having the following composition:

| Dyestuff dispersion | 7 parts |
|---|---|
| 5% Sodium alginate aqueous solution | 55 parts |
| Diacetate of polypropylene glycol, average molecular weight: 300 | 10 parts |
| Polyethylene glycol diglycidyl ether, average molecular weight: 200 | 3 parts |
| Water | 25 parts |
| | 100 parts (pH 6.5) | was prepared. A mercerized cotton broad (40 counts) was printdyed with the printing color paste using a screen print dyeing machine. After provisionally drying at 80° C. for 3 minutes, the dyed cotton broad was treated with superheated steam at 185° C. for 7 minutes.

Then, washing treatment was conducted following the procedures described in Example 1 to obtain a rubinedyed product having excellent light fastness and wet color fastness.

The dyestuff used in this example was prepared by dissolving 7.9 g of 2-amino-6-nitrobenzothiazole in 20 g of 70% sulfuric acid, gradually adding 18 g of 40% nitrosil sulfuric acid, stirring the obtained mixture at 0°–2° C. for 4 hours, then adding dropwise this diazo solution to a solution of 2 g of urea and 14.3 g of N-cyanoethyl-N-(2-fluoro-4-N,N-diethylamino-6-triazinyloxy)ethylaniline in 300 ml of methanol, filtering out the resulting precipitates, washing with water, and drying at room temperature to obtain 17 g (yield 75%) of the dyestuff powder of the structural formula above.

The λmax (acetone) of this dyestuff was 543 nm.

EXAMPLE 3

A dyestuff ink was prepared from a dyestuff composition composed of 10 parts of a monoazo dyestuff of the

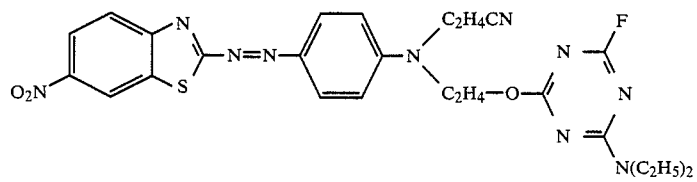

10 parts of a Pluronic type surface active agent ("Pluronic L 64", trademark, manufactured by Asahi Elecstructural formula:

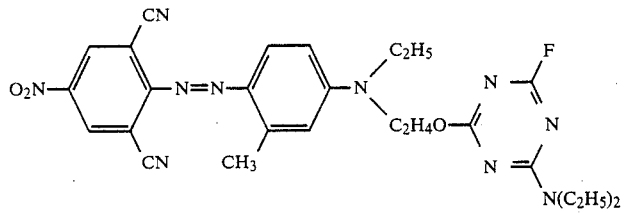

2 parts of polyoxyethylene glycol nonyl phenyl ether (HLB 8.9) and 88 parts of diethylene glycol diacetate by pulverizing using a paint conditioner as a finely dispersing machine.

10 parts of this dyestuff ink and 55 parts of mineral terpene were mixed, this mixture was gradually added to 35 parts of an aqueous solution having the following composition while stirring using a homomixer (5,000–7,000 rpm) until the system became homogeneous. Thus, a viscous O/W emulsion color paste was prepared.

| Water | 31 parts |
|---|---|
| Lepitol G (trademark, manufactured by Daiichi Kogyo Seiyaku Co., Ltd., special nonionic surface active agent) | 3.8 parts |
| Sodium trichloroacetate | 0.1 part |
| | 34.9 parts |

Then, a polyester/cotton (mixing ratio: 65/35) mixed spun cloth was print-dyed with the color paste using a screen print dyeing machine, dried at 100° C. for 2 minutes, and then treated with superheated steam at 175° C. for 7 minutes. The dyed cloth was washed in a hot tetrachloroethylene bath containing a small amount of water and dried to obtain a blue dyed product having excellent light fastness and wet color fastness without any stain on white ground.

The dyestuff used in this example was prepared by dissolving 12.3 g of a dyestuff of the formula:

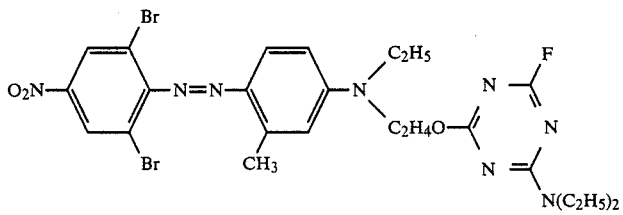

prepared according to the procedures described in Example 2 in 50 ml of N,N-dimethylformamide, adding 7.0 g of cuprous cyanide, stirring at 110° C. for 3 hours to complete the reaction, then pouring the reaction mixture into 200 ml of a 5% ferric chloride solution, filtering out the resulting precipitates, washing with water and drying at room temperature to obtain 10.0 g (yield 90%) of the dicyano compound of the structural formula above.

The λmax (acetone) of this dyestuff was 598 nm.

EXAMPLE 4

A dyestuff dispersion was prepared from a dyestuff composition composed of 16 parts of a monoazo dyestuff having the structural formula:

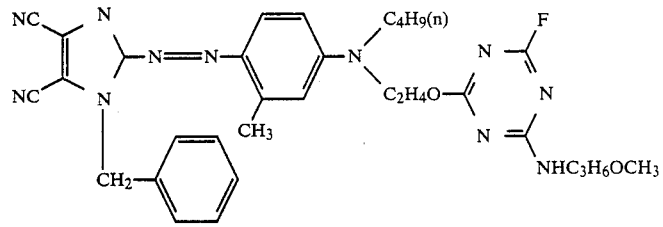

7 parts of polyoxyethylene glycol nonyl phenyl ether (HLB 13.3), 3 parts of a naphthalenesulfonic acid-formaldehyde condensate and 74 parts of water by finely dispersing using a sand grinder.

Using this dyestuff dispersion, a padding bath having the following composition was prepared.

| Dyestuff dispersion | 6 parts |
|---|---|
| Tetraethylene glycol dimethyl ether | 15 parts |
| Water | 79 parts |
| | 100 parts (pH 8.0) |

A polyester/cotton (mixing ratio: 65/35) mixed spun cloth was impregnated with the padding bath, squeezed to a squeezing rate of 45%, then dried at 100° C. for 2 minutes and dry heated at 200° C. for one minute to fix. This cloth was washed with a hot ethanol bath to obtain a red dyed product having excellent light fastness and wet color fastness.

The dyestuff used in this example was prepared by dissolving 10.4 g of a dyestuff of the formula:

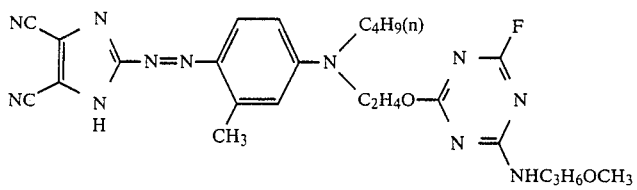

prepared according to the procedures described in Example 1 in 50 ml of N-methylpyrrolidone, adding 2.6 g of benzyl chloride and 2.2 g of triethylamine, stirring at 80° C. for 3 hours to complete the reaction, then pouring the reaction mixture into cold water, filtering out the resulting precipitates, washing with water and drying at room temperature to obtain 9.6 g (yield 80%) of the N-substituted imidazole type dyestuff of the structural formula above.

The λmax (acetone) of this dyestuff was 518 nm.

EXAMPLE 5

Print dyeing was conducted in the same manner as in Example 1 except that the fiber was replaced by a nylon/rayon (mixing ratio: 50/50) mixed spun cloth and the dry heating temperature was changed to 185° C., to obtain an orange dyed product having good wet color fastness and light fastness.

EXAMPLE 6

Print dyeing was conducted using the monoazo dyestuffs set forth in Table 2 respectively in the same manner as described in Example 1. The light fastness and wet color fastness of each obtained dyed product were both good.

The hue of each dyed product and the λmax (acetone) of each dyestuff are shown in Table 2.

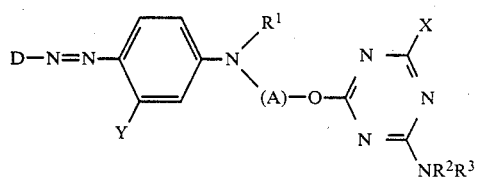

TABLE 2

| | D— | —R¹ | —R² | —R³ | —X | —Y | —A— | Hue of Dyed Cloth | λmax (acetone) nm |
|---|---|---|---|---|---|---|---|---|---|
| 1 | $O_2N$-C₆H₄- | —C₂H₄COOCH₃ | —C₂H₅ | —C₂H₅ | —F | —H | —C₂H₄— | Orange | 461 |
| 2 | " | —C₂H₄OCOCH₃ | " | " | " | " | " | " | 458 |
| 3 | " | —C₂H₄COOCH₂-C₆H₅ | " | " | " | " | " | " | 460 |
| 4 | " | —C₂H₄OCO-C₆H₅ | " | " | " | " | " | " | 458 |
| 5 | " | —C₂H₄COOC₂H₄O-C₆H₅ | " | " | " | " | " | " | 459 |
| 6 | " | —C₃H₆COOC₂H₅ | —C₂H₅ | —C₂H₅ | " | " | " | " | 464 |
| 7 | " | —C₂H₄COOC₄H₉(n) | " | " | " | " | —C₂H₄— | Orange | 458 |
| 8 | $O_2N$-C₆H₄- | —C₂H₄CN | " | " | —Cl | " | " | " | 453 |
| 9 | $F_3C$-C₆H₄- | —CH₂COOCH₂-C₆H₅ | " | " | —F | —H | " | " | 437 |
| 10 | Cl,$O_2N$-C₆H₃- | —C₂H₅ | —C₄H₉(n) | —C₄H₉(n) | —F | —H | " | Scarlet | 492 |
| 11 | " | —CH₂—CH=CH₂ | " | " | " | " | " | " | 487 |
| 12 | " | —C₂H₄OCOCH₂Cl | " | " | " | " | " | " | 478 |

TABLE 2-continued
| | D— | —R¹ | —R² | —R³ | —X | —Y | —A— | Hue of Dyed Cloth | λmax (acetone) nm |
|---|---|---|---|---|---|---|---|---|---|
| 13 | 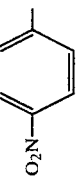 | —C₂H₄OCOC₂H₄Cl | —C₄H₉(n) | —C₄H₉(n) | —F | —H | —C₂H₄— | Scarlet | 483 |
| 14 | 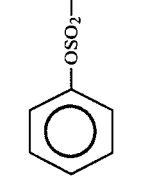 | —CH₂— | " | " | —Cl | —CH₃ | " | " | 485 |
| 15 | " | 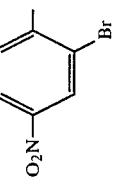—C₂H₄O— | " | " | " | " | " | " | 484 |
| 16 |  | —C₂H₄— | " | " | —F | " | " | " | 428 |
| 17 | " | 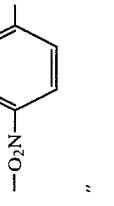—C₃H₆O— | " | " | " | " | —CH₂—CH—<br>　　　｜<br>　　　CH₃ | " | 425 |
| 18 | " | —CH₂— | " | " | —Cl | " | " | " | 423 |
| 19 | 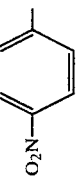 | —C₂H₅ | —H | —C₃H₇(n) | —F | —H | —C₂H₄— | Rubine | 519 |
| 20 | " | —C₂H₄OCH₃ | " | " | " | " | " | " | 516 |

TABLE 2-continued
| | D— | —R¹ | —R² | —R³ | —X | —Y | —A— | Hue of Dyed Cloth | λmax (acetone) nm |
|---|---|---|---|---|---|---|---|---|---|
| 21 | " | —C₂H₄OH | " | " | " | —Cl | " | " | 518 |
| 22 | " | —C₂H₄Cl | " | " | " | " | " | " | 507 |
| 23 | " | —C₄H₉(n) | " | " | " | —CH₃ | " | " | 531 |
| 24 | 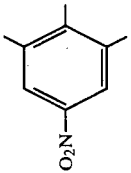 | —C₂H₅ | —C₂H₅ | —C₂H₅ | " | —H | " | " | 535 |
| 25 | 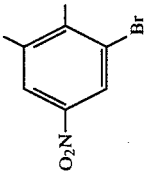 | —C₂H₄OCH₃ | —C₂H₅ | —C₂H₅ | —F | —H | " | Rubine | 533 |
| 26 | " | —CH₂⟨Ph⟩ | —H | —C₂H₄OCH₃ | " | " | —C₂H₄— | " | 532 |
| 27 | " | —C₂H₄OC₄H₉(n) | " | " | " | —CH₃ | " | " | 543 |
| 28 | 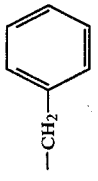 | —C₂H₄OC₂H₄OCH₃ | —C₂H₅ | —C₂H₅ | " | —NHCOCH₃ | " | Blue | 591 |
| 29 | " | —CH₂⟨Ph⟩ | " | " | " | " | " | " | 589 |
| 30 | " | —CH₂COOCH₂⟨Ph⟩ | " | " | " | " | " | " | 585 |

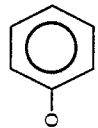

TABLE 2-continued
| | D— | —R¹ | —R² | —R³ | —X | —Y | —A— | Hue of Dyed Cloth | λmax (acetone) nm |
|---|---|---|---|---|---|---|---|---|---|
| 41 | " | —C₅H₁₁(n) | —H |  | " | " | —CH₂—CH(C₂H₅)— | " | 533 |
| 42 | 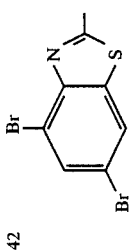 | —C₂H₄COOCH₂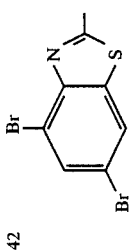 | " | " | " | " | " | " | 528 |
| 43 | " | —C₂H₄O | —H | 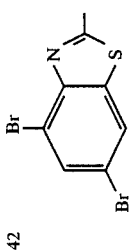 | —Cl | —Cl | —C₂H₄— | Rubine | 524 |
| 44 |  | —CH₂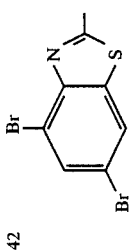 | " | " | —F | —H | " | " | 533 |
| 45 | " | —C₂H₅ | —C₂H₅ | —C₂H₅ | " | —CH₃ | " | " | 536 |
| 46 | 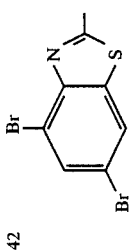 | " | " | " | " | —H | " | " | 548 |
| 47 | " | —C₂H₄O | —C₂H₄OCH₃ | —C₂H₄OCH₃ | " | " | " | " | 544 |
| 48 |  | —C₂H₄COOCH₃ | " | " | —F | —CH₃ | " | " | 545 |
| 49 | 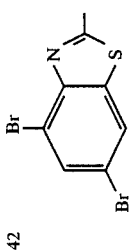 | —C₂H₅ | —C₂H₅ | " | " | " | —C₂H₄— | Rubine | 518 |

TABLE 2-continued

| No. | D— | —R¹ | —R² | —R³ | —X | —Y | —A— | Hue of Dyed Cloth | λmax (acetone) nm |
|---|---|---|---|---|---|---|---|---|---|
| 50 | ![2-methylbenzothiazole-6-NCS] | —C₂H₄CN | " | " | " | " | " | " | 518 |
| 51 | " | " | —H | —C₂H₄OCH₃ | " | —H | " | " | 512 |
| 52 | " | " | " | —C₃H₆OCH₃ | " | " | " | " | 521 |
| 53 | ![2-methylbenzothiazole-6-SO₂OCH₃] | —C₂H₄OCOOC₂H₅ | " | —C₂H₄OC₂H₄OCH₃ | " | " | " | " | 526 |
| 54 | " | —C₂H₄OCOCH₃ | " | —C₃H₆OCH(CH₃)CH₃ | —Cl | " | " | " | 528 |
| 55 | ![4-nitrophenyl-isothiazole] | —C₂H₅ | —C₂H₅ | —C₂H₅ | —F | —H | " | Navy | 597 |
| 56 | " | —C₂H₄—⟨Ph⟩ | " | " | " | " | —C₂H₄— | " | 595 |
| 57 | " | —C₂H₄OCO—⟨Ph⟩ | " | " | " | " | " | " | 594 |
| 58 | ![4-bromophenyl-isothiazole] | —C₄H₉(n) | " | " | " | " | " | Rubine | 565 |
| 59 | " | —C₂H₄O—⟨Ph⟩ | " | " | " | " | " | " | 564 |

TABLE 2-continued
| | D— | —R¹ | —R² | —R³ | —X | —Y | —A— | Hue of Dyed Cloth | λmax (acetone) nm |
|---|---|---|---|---|---|---|---|---|---|
| 60 | " | —C₂H₄OH | " | " | " | " | " | " | 572 |
| 61 | 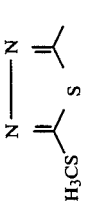 | —C₅H₁₁(n) | —C₂H₅ | —C₂H₅ | —F | —H | —C₂H₄— | Scarlet | 516 |
| 62 | 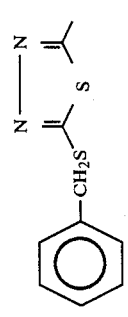 | —C₂H₅ | " | " | " | —CH₃ | " | " | 521 |
| 63 | " | —C₂H₄—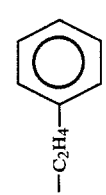 | " | " | " | —NHCOCH₃ | " | Rubine | 532 |
| 64 | 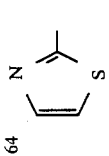 | —C₂H₅ | —CH₂—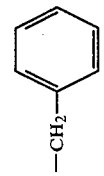 | —H | " | —H | —CH₂—CH(CH₃)— | Scarlet | 486 |
| 65 | " | " | —C₂H₄OH | —C₂H₄OH | " | " | " | " | " |
| 66 | 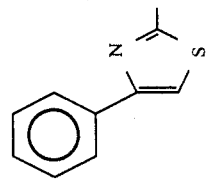 | " | " | " | " | " | " | " | 489 |

TABLE 2-continued

| | D— | —R¹ | —R² | —R³ | —X | —Y | —A— | Hue of Dyed Cloth | λmax (acetone) nm |
|---|---|---|---|---|---|---|---|---|---|
| 67 | ![phenyl-thiazole] | —C₂H₅ | —C₂H₄CN | —C₂H₄CN | —F | —H | —CH₂—CH(CH₃)— | Scarlet | 489 |
| 68 | ![nitro-thiazole] | " | —C₅H₁₁(n) | —C₅H₁₁(n) | " | " | —C₂H₄— | Rubine | 578 |
| 69 | " | " | —H | —C₈H₁₇(n) | " | " | " | " | " |
| 70 | " | —CH₃ | —CH₂—CH=CH₂ | —CH₂—CH=CH₂ | " | " | " | " | " |
| 71 | ![bromo-thiazole] | " | ![phenyl] | —CH₃ | " | —Cl | " | Scarlet | 487 |
| 72 | " | —C₂H₅ | —C₂H₅ | —C₂H₅ | " | —CH₃ | " | " | 498 |
| 73 | ![methylpyridine] | —C₂H₅ | —C₂H₅ | —C₂H₅ | —F | —H | —C₂H₄— | Orange | 463 |
| 74 | " | —C₂H₄O—![phenyl] | " | " | " | —CH₃ | " | " | 458 |
| 75 | " | —CH₂—![phenyl] | " | " | " | —NHCOCH₃ | " | " | 482 |

TABLE 2-continued

| No. | D— | —R¹ | —R² | —R³ | —X | —Y | —A— | Hue of Dyed Cloth | λmax (acetone) nm |
|---|---|---|---|---|---|---|---|---|---|
| 76 | 2-chloropyridyl | —C₂H₄CN | " | " | " | —H | " | " | 451 |
| 77 | " | —CH₂COOCH₂(phenyl) | —C₂H₄OH | —C₂H₄CN | " | " | " | " | 450 |
| 78 | 2,6-dichloro-3-methylpyridyl | —C₂H₄COOC₂H₄O(phenyl) | —C₂H₅ | —C₂H₅ | " | " | " | " | 458 |
| 79 | " | —CH₂(phenyl) | —C₂H₅ | —C₂H₅ | —F | —CH₃ | " | Orange | 469 |
| 80 | " | —C₂H₄(phenyl) | " | " | " | —H | " | " | 462 |
| 81 | " | —C₆H₁₃(n) | " | " | " | " | " | " | 465 |
| 82 | 3-cyano-2-methylthienyl | —C₂H₄CN | " | " | " | " | " | Rubine | 535 |
| 83 | " | —C₂H₄OCH₃ | " | " | " | —CH₃ | " | " | 543 |
| 84 | 3,5-dinitro-2-methylthienyl | —C₂H₅ | " | " | " | —H | " | Navy | 621 |

TABLE 2-continued

| | D— | —R¹ | —R² | —R³ | —X | —Y | —A— | Hue of Dyed Cloth | λmax (acetone) nm |
|---|---|---|---|---|---|---|---|---|---|
| 85 | thiophene with NO₂, CH₃, O₂N substituents | —CH₂COOCH₃ | —C₂H₅ | —C₂H₅ | —F | —NHCOCH₃ | —C₂H₄— | Navy | 628 |
| 86 | " | —C₂H₄O—(phenyl) | " | " | " | —CH₃ | " | " | 632 |
| 87 | thiophene with CN, CH₃, O₂N substituents | —C₂H₅ | —(2,6-dimethylphenyl) | —H | " | " | " | Blue | 626 |
| 88 | " | —C₂H₄COOCH₃ | —C₃H₇(n) | —C₃H₇(n) | " | " | " | " | 618 |
| 89 | " | —CH₂—(tetrahydrofuran-2-yl) | " | " | " | " | " | " | 623 |
| 90 | thiophene with CN, CH₃, NC substituents | —C₂H₄O—CH₂—CH=CH₂ | " | " | " | " | " | " | 624 |
| 91 | " | —C₂H₅ | —C₂H₅ | —C₂H₅ | —F | —H | —C₂H₄— | Navy | 595 |
| 92 | " | —C₂H₄OCH₃ | " | " | " | " | " | " | 592 |
| 93 | " | —C₂H₅ | " | —H | " | " | " | " | 613 |
| 94 | thiophene with NO₂, CH₃, H₃COC substituents | —C₂H₄OCH₃ | —C₃H₇(n) | " | " | —CH₃ | " | " | 618 |
| 95 | " | —C₂H₄—(phenyl) | " | " | " | —NHCOCH₃ | " | " | 618 |

TABLE 2-continued

| | D— | —R¹ | —R² | —R³ | —X | —Y | —A— | Hue of Dyed Cloth | λmax (acetone) nm |
|---|---|---|---|---|---|---|---|---|---|
| 96 | O₂N—[thiazole-S ring with methyl] | —C₂H₅ | " | | " | —CH₃ | | " | 593 |
| 97 | O₂N—[thiazole-S ring with methyl] | —C₂H₄O—phenyl | —CH₂—CH(C₂H₅)—C₄H₉(n) | —H | —F | —CH₃ | —C₂H₄— | Navy | 590 |
| 98 | " | —C₂H₄CN | " | " | —Cl | " | " | Rubine | 564 |
| 99 | " | —C₂H₄OCOCH₃ | —C₄H₉(n) | " | " | " | " | " | 572 |
| 100 | [thiazole with Br] | —CH₂COOCH₃ | —C₃H₇(n) | " | —F | " | " | " | 548 |
| 101 | " | —C₂H₄OCOOCH₃ | —H | " | " | " | " | " | 557 |
| 102 | [isothiazole ring with phenyl] | —CH₂COOCH₂—phenyl | —CH₃ | " | " | " | " | Blue | 608 |
| 103 | O₂N—[isothiazole ring with phenyl] | —C₂H₄CN | —CH₃ | —CH₃ | —F | —H | —C₂H₄— | Blue | 607 |
| 104 | " | —C₂H₅ | " | " | " | " | " | " | 625 |
| 105 | [isothiazole] | —C₂H₄COOCH₂—phenyl | " | " | " | " | " | Rubine | 573 |
| 106 | O₂N—[isothiazole] | —C₂H₄O—phenyl | —H | —H | " | " | " | " | 578 |

TABLE 2-continued
| | D— | $-R^1$ | $-R^2$ | $-R^3$ | $-X$ | $-Y$ | $-A-$ | Hue of Dyed Cloth | λmax (acetone) nm |
|---|---|---|---|---|---|---|---|---|---|
| 107 |  | $-C_2H_5$ | $-C_2H_5$ | " | " | $-CH_3$ | " | Blue | 627 |
| 108 | " | 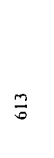 | 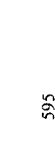 | " | " | $-H$ | " | " | 613 |
| 109 |  | $-C_2H_5$ | ($-NR^2R^3 =$)  | | $-F$ | $-NHCOCH_3$ | $-C_2H_4-$ | Navy | 595 |
| 110 | " | " | ($-NR^2R^3 =$) 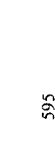 | | " | $-CH_3$ | " | " | 592 |
| 111 |  | $-C_2H_4OCH_3$ | ($-NR^2R^3 =$)  | | " | $-H$ | " | Rubine | 570 |
| 112 | " |  | $-C_2H_5$ | $-C_2H_5$ | " | " | " | " | 568 |

TABLE 2-continued

| | D— | —R$^1$ | —R$^2$ | —R$^3$ | —X | —Y | —A— | Hue of Dyed Cloth | λmax (acetone) nm |
|---|---|---|---|---|---|---|---|---|---|
| 113 | p-tolyl-C(=O)-O-C$_2$H$_4$-O-phenyl- | —C$_2$H$_4$CN | phenyl | —H | | | | Orange | 446 |
| 114 | " | —C$_2$H$_4$O-phenyl | —CH$_2$-phenyl | " | " | " | " | " | 451 |
| 115 | 3,5-dibromo-4-methyl-phenyl-C(=O)-O-C$_2$H$_4$-O-phenyl- | —C$_2$H$_4$OCH$_3$ | —CH$_2$-phenyl | —CH$_2$-phenyl | —F | —CH$_3$ | —C$_2$H$_4$— | Orange | 429 |
| 116 | H$_3$CS-C(=N-)-C(-S-N=)-CH$_3$ (thiadiazole) | —C$_2$H$_5$ | —C$_2$H$_5$ | —C$_2$H$_5$ | " | " | " | Rubine | 518 |
| 117 | H$_3$COOC-C(=N-)-C(-S-N=)-CH$_3$ (thiadiazole) | —C$_2$H$_4$OCH$_3$ | " | " | " | " | " | " | 523 |
| 118 | NC-C(=N-)-C(-N(CH$_3$)-N=)-CH$_3$, with NC substituent (pyrazole) | —C$_2$H$_5$ | " | " | " | " | " | Red | 508 |
| 119 | NC-C(=N-)-C(-N(CH$_2$-phenyl)-N=)-CH$_3$, with NC substituent (pyrazole) | " | " | " | " | " | " | " | 515 |

TABLE 2-continued

| | D— | —R¹ | —R² | —R³ | —X | —Y | —A— | Hue of Dyed Cloth | λmax (acetone) nm |
|---|---|---|---|---|---|---|---|---|---|
| 120 | NC-C(=C)-N(CH₂-C₆H₄-NO₂)-C(CH₃)=N (isopropylidene-type, p-nitrobenzyl) | " | " | " | " | " | " | " | 525 |
| 121 | " | —C₅H₁₁(n) | —C₂H₄OCH₃ | —H | —F | —H | —C₂H₄— | Red | 493 |
| 122 | NC-C(=C)-N(CH₂-C₆H₄-Cl)-C(CH₃)=N (isopropylidene-type, p-chlorobenzyl) with 2-methylbenzimidazole (N-CH₃) | —C₂H₄O—C₆H₅ | " | " | " | " | " | " | 516 |
| 123 | " | —C₂H₅ | —C₅H₁₁(n) | " | " | —NHCOCH₃ | " | " | 521 |
| 124 | NC-C(=C)-N(CH₂CN)-C(CH₃)=N | " | " | " | " | —Cl | " | " | 528 |

What is claimed is:

1. A monoazo dyestuff of the formula:

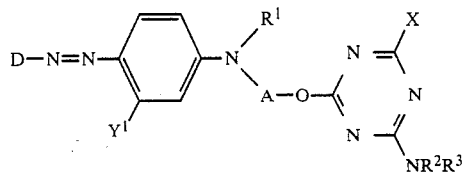

wherein D represents phenyl; phenyl substituted by fluorine, chlorine, bromine, methyl, ethyl, trifluoromethyl, methoxy, ethoxy, phenylazo, cyano, nitro, methylsulfonyl, ethylsulfonyl, arylsulfonyl, lower alkoxycarbonyl, lower alkoxyethoxycarbonyl, aryloxyethoxycarbonyl, mono-lower-alkylaminocarbonyl, di-lower-alkylaminocarbonyl, diallylaminocarbonyl, monoallylaminocarbonyl, dimethylaminosulfonyl, diethylaminosulfonyl, monomethylaminosulfonyl, monoethylaminosulfonyl, acetyl or phenyl; pyridyl; pyridyl substituted by chlorine, bromine, nitro, methyl, methylsulfonyl or cyano; thiazolyl; thiazolyl substituted by methyl, chlorine, bromine, nitro, lower alkoxycarbonyl, methoxyethoxycarbonyl, ethoxyethoxycarbonyl, trifluoromethyl or methylsulfonyl; 1,3,4-thiadiazolyl; 1,3,4-thiadiazolyl substituted by alkylthio, arylthio, alkenylthio, aralkylthio, bromine, chlorine, trifluoromethyl or alkylsulfonyl; 1,2,4-thiadiazolyl; 1,2,4-thiadiazolyl substituted by alkylthio, arylthio, alkenylthio, aralkylthio or alkoxycarbonyl; thienyl substituted by cyano, chlorine, bromine, acetyl, formyl, nitro, alkoxycarbonyl or sulfomethyl; benzoisothiazolyl; benzoisothiazolyl substituted by nitro, bromine, chlorine, acetyl or alkoxycarbonyl; pyridinoisothiazolyl substituted by cyano, methyl or nitro; thienoisothiazolyl; thienoisothiazolyl substituted by nitro, bromine, chlorine or cyano; thienothiazolyl; thienothiazolyl substituted by nitro, bromine, chlorine or cyano; thienothiazolyl substituted by nitro bromine or chlorine; benzothiazolyl; or benzothiazolyl substituted by methyl, chlorine, bromine, nitro, lower alkoxycarbonyl, thiocyano, trifluoromethyl or methylsulfonyl; $R^1$ represents alkyl; substituted alkyl, cyclohexyl, alkenyl, aralkyl or substituted aralkyl; $R^2$ and $R^3$ each represent hydrogen, alkyl, alkyl substituted by a member selected from the group consisting of cyano, hydroxy, alkoxy and alkoxyalkoxy, alkenyl, cyclohexyl, aryl or aralkyl, or $R^2$ and $R^3$ together with the nitrogen atom represent a 5- or 6-membered nitrogen-containing heterocyclic ring selected from the group consisting of pyrrolidinyl, 3-methyl-1-pyrrolidinyl, 2-hydroxyethyl-1-pyrrolidinyl, 2,5-dimethyl-1-pyrrolidinyl, 3-thiazolidinyl, 1-pyrrolyl, 1-pyrazolyl, 1-imidazolyl, morpholino, piperidino, 2,6-dimethylpiperidino, 1-piperadinyl and 4-methyl-1-piperadinyl; A represents

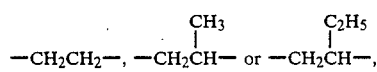

X represents fluorine or chlorine; and $Y^1$ represents hydrogen, chlorine, methyl or acylamino selected from the group consisting of acetylamino, chloroacetylamino, benzoylamino, methylsulfonylamino, chloropropionylamino, ethoxycarbonylamino and ethylaminocarbonylamino.

2. The monoazo dyestuff according to claim 1, which is of the formula:

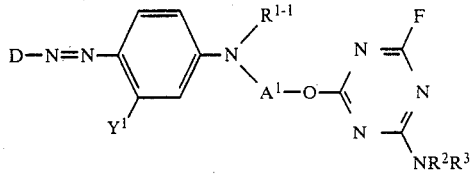

wherein D represents phenyl; phenyl substituted by fluorine, chlorine, bromine, methyl, ethyl, trifluoromethyl, methoxy, ethoxy, phenylazo, cyano, nitro, methylsulfonyl, ethylsulfonyl, arylsulfonyl, lower alkoxycarbonyl, lower alkoxyethoxycarbonyl, aryloxyethoxycarbonyl, mono-lower-alkylaminocarbonyl, di-lower-alkylaminocarbonyl, diallylaminocarbonyl, monoallylaminocarbonyl, dimethylaminosulfonyl, diethylaminosulfonyl, monomethylaminosulfonyl, monoethylaminosulfonyl, acetyl or phenyl; pyridyl; pyridyl substituted by chlorine, bromine, nitro, methyl, methylsulfonyl or cyano; thiazolyl; thiazolyl substituted by methyl, chlorine, bromine, nitro, lower alkoxycarbonyl, methoxyethoxycarbonyl, ethoxyethoxycarbonyl, trifluoromethyl or methylsulfonyl; 1,3,4-thiadiazolyl; 1,3,4-thiadiazolyl substituted by alkylthio, arylthio, alkenylthio, aralkythio, bromine, chlorine, trifluoromethyl or alkylsulfonyl; 1,2,4-thiadiazolyl; 1,2,4-thiadiazolyl substituted by alkylthio, arylthio, alkenylthio, aralkylthio or alkoxycarbonyl; thienyl substituted by cyano, chlorine, bromine, acetyl, formyl, nitro, alkoxycarbonyl or sulfomethyl; benzoisothiazolyl; benzoisothiazolyl substituted by nitro, bromine, chlorine, acetyl or alkoxycarbonyl; or pyridinoisothiazolyl substituted by cyano, methyl or nitro; thienoisothiazolyl; thienoisothiazolyl substituted by nitro, bromine, chlorine or cyano; thienothiazolyl; thienothiazolyl substituted by nitro, bromine or chlorine; benzothiazolyl; or benzothiazolyl substituted by methyl, chlorine, bromine, nitro, lower alkoxycarbonyl, thiocyano, trifluoromethyl or methylsulfonyl; $R^1$ represents alkyl; substituted alkyl; alkenyl; substituted alkenyl; aralkyl; or substituted aralkyl; $R^2$ and $R^3$ each represent hydrogen, alkyl, alkyl substituted by a member selected from the group consisting of cyano, hydroxy, alkoxy and alkoxyalkoxy, alkenyl, cyclohexyl, aryl or aralkyl, or $R^2$ and $R^3$ together with the nitrogen atom represent a 5- or 6-membered nitrogen-containing heterocyclic ring selected from the group consisting of 1-pyrrolidinyl, 3-methyl-1-pyrrolidinyl, 2-hydroxyethyl-1-pyrrolidinyl, 2,5-dimethyl-1-pyrrolidinyl, 3-thiazolidinyl, 1-pyrrolyl, 1-pyrazolyl, 1-imidazolyl, morpholino, piperidino, 2,6-dimethylpiperidino, 1-piperadinyl and 4-methyl-1-piperadinyl; A' represents —CH₂CH₂—, or

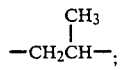

and $Y^1$ represents hydrogen, chlorine, methyl or acylamino selected from the group consisting of acetylamino, chloroacetylamino, benzoylamino, methylsulfonylamino, chloropropionylamino, ethoxycarbonylamino, and ethylaminocarbonylamino.

3. The monoazo dyestuff according to claim 1, which is of the formula:

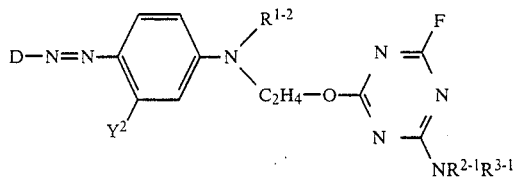

wherein D represents phenyl; phenyl substituted by fluorine, chlorine, bromine, methyl, ethyl, trifluoromethyl, methoxy, ethoxy, phenylazo, cyano, nitro, methylsulfonyl, ethylsulfonyl, arylsulfonyl, lower alkoxycarbonyl, lower alkoxyethoxycarbonyl, aryloxyethoxycarbonyl, mono-lower-alkylaminocarbonyl, di-lower-alkylaminocarbonyl, diallylaminocarbonyl, monoallylaminocarbonyl, dimethylaminosulfonyl, diethylaminosulfonyl, monomethylaminosulfonyl, monoethylaminosulfonyl, acetyl or phenyl; pyridyl; pyridyl substituted by chlorine, bromine, nitro, methyl, methylsulfonyl or cyano; thiazolyl; thiazolyl substituted by methyl, chlorine, bromine, nitro, lower alkoxycarbonyl, methoxyethoxycarbonyl, ethoxyethoxycarbonyl, trifluoromethyl or methylsulfonyl; 1,3,4-thiadiazolyl; 1,3,4-thiadiazolyl substituted by alkylthio, arylthio, alkenylthio, aralkythio, bromine, chlorine, trifluoromethyl or alkylsulfonyl; 1,2,4-thiadiazolyl; 1,2,4-thiadiazolyl substituted by alkylthio, arylthio, alkenylthio, aralkylthio or alkoxycarbonyl; thienyl substituted by cyano, chlorine, bromine, acetyl, formyl, nitro, alkoxycarbonyl or sulfomethyl; benzoisothiazolyl; benzoisothiazolyl substituted by nitro, bromine, chlorine, acetyl or alkoxycarbonyl; pyridinoisothiazolyl substituted by cyano, methyl or nitro; thienoisothiazolyl; thienoisothiazolyl substituted by nitro, bromine, chlorine or cyano; thienothiazolyl; thienothiazolyl substituted by nitro, bromine or chlorine; benzothiazolyl; or benzothiazolyl substituted by methyl, chlorine, bromine, nitro, lower alkoxycarbonyl, thiocyano, trifluoromethyl or methylsulfonyl; $R^{1-2}$ represents alkyl, substituted alkyl; $R^{2-1}$ and $R^{3-1}$ each represent hydrogen, alkyl, alkyl substituted by a member selected from the group consisting of cyano, hydroxy, alkoxy and alkoxyalkoxy, or aryl, or $R^{2-1}$ and $R^{3-1}$ together with the nitrogen atom represent a 5- or 6-membered nitrogen-containing heterocyclic ring selected from the group consisting of 1-pyrrolidinyl, 3-methyl-1-pyrrolidinyl, 2-hydroxyethyl-1-pyrrolidinyl, 2,5-dimethyl-1-pyrrolidinyl, 3-thiazolidinyl, 1-pyrrolyl, 1-pyrazolyl, 1-imidazolyl, morpholino, piperidino, 2,6-dimethylpiperidino, 1-piperadinyl and 4-methyl-1-piperadinyl; and $Y^2$ represents hydrogen or methyl.

4. The monoazo dyestuff according to claim 1, which is of the formula:

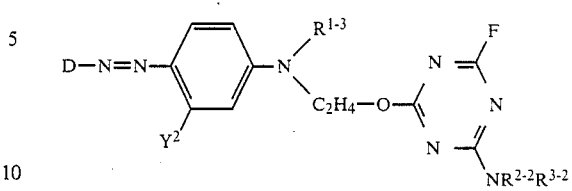

wherein D represents phenyl; phenyl substituted by fluorine, chlorine, bromine, methyl, ethyl, trifluoromethyl, methoxy, ethoxy, phenylazo, cyano, nitro, methylsulfonyl, ethylsulfonyl, arylsulfonyl, lower alkoxycarbonyl, lower alkoxyethoxycarbonyl, aryloxyethoxycarbonyl, mono-lower-alkylaminocarbonyl, di-lower-alkylaminocarbonyl diallylaminocarbonyl, monoallylaminocarbonyl, dimethylaminosulfonyl, diethylaminosulfonyl, monomethylaminosulfonyl, monoethylaminosulfonyl, acetyl or phenyl; pyridyl; pyridyl substituted by chlorine, bromine, nitro, methyl, methylsulfonyl or cyano; thiazolyl; thiazolyl substituted by methyl, chlorine, bromine, nitro, lower alkoxycarbonyl, methoxyethoxycarbonyl, ethoxyethoxycarbonyl, trifluoromethyl or methylsulfonyl; 1,3,4-thiadiazolyl; 1,3,4-thiadiazolyl substituted by alkylthio, arylthio, alkenylthio, aralkylthio, bromine, chlorine, trifluoromethyl or alkylsulfonyl; 1,2,4-thiadiazolyl; 1,2,4-thiadiazolyl substituted by alkylthio, arylthio, alkenylthio, aralkylthio or alkoxycarbonyl; thienyl substituted by cyano, chlorine, bromine, acetyl, formyl, nitro, alkoxycarbonyl or sulfomethyl; benzoisothiazolyl; benzoisothiazolyl substituted by nitro, bromine, chlorine, acetyl or alkoxycarbonyl; pyridinoisothiazolyl substituted by cyano, methyl or nitro; thienoisothiazolyl; thienoisothiazolyl substituted by nitro, bromine, chlorine or cyano; thienothiazolyl; thienothiazolyl substituted by nitro, bromine or chlorine; benzothiazolyl or benzothiazolyl substituted methyl, chlorine, bromine, nitro, lower alkoxycarbonyl, thiocyano, trifluoromethyl or methylsulfonyl; $R^1$ represents a $C_1$-$C_5$ alkyl; or $C_1$-$C_5$ alkyl substituted by cyano or lower alkoxy; $R^{2-2}$ and $R^{3-2}$ each represent hydrogen, alkyl, alkyl substituted by alkoxy or phenyl; and $Y^2$ represents hydrogen or methyl.

5. The monoazo dyestuff according to claim 1 which is of the formula:

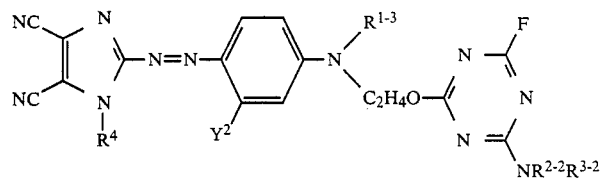

wherein $R^{1-3}$, $R^{2-2}$, $R^{3-2}$ and $Y^2$ are as defined above, and $R^4$ represents lower alkyl, lower alkyl substituted by alkoxy, lower alkenyl, benzyl or benzyl optionally substituted by chlorine or bromine.

6. The monoazo dyestuff according to claim 1, which is of the formula:

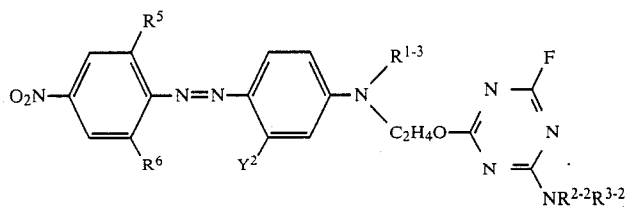

wherein $R^{1-3}$, $R^{2-2}$, $R^{3-2}$ and $Y^2$ are as defined above, and $R^5$ and $R^6$ each represent chlorine, bromine or cyano.

7. The monoazo dyestuff according to claim 1, which is of the formula:

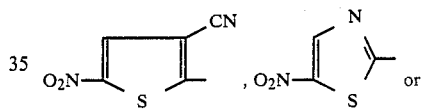

wherein $R^{1-3}$, $R^{2-2}$, $R^{3-2}$ and $Y^2$ are as defined above, and $R^7$ represents chlorine, bromine, nitro, thiocyano or methylsulfonyl.

8. The monoazo dyestuff according to claim 1, which is of the formula:

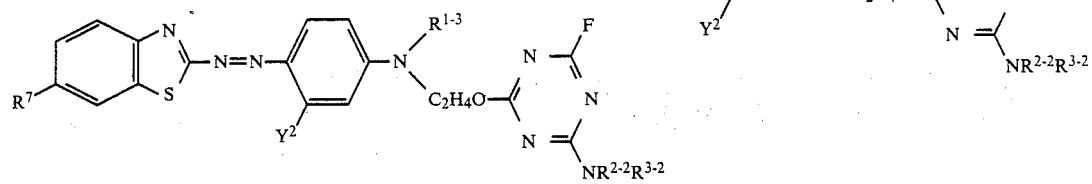

wherein $R^{1-3}$, $R^{2-2}$, $R^{3-2}$ and $Y^2$ are as defined above, and $D^1$ represents

9. The monoazo dyestuff of claim 1, wherein said alkyl group of substituent R' is methyl, ethyl or straight or branched chain propyl, butyl, pentyl hexyl, heptyl or octyl.

* * * * *